United States Patent
Cathey et al.

[11] Patent Number: 6,059,936
[45] Date of Patent: May 9, 2000

[54] RAPID ANNEALING OF POWDER PHOSPHORS

[75] Inventors: David A. Cathey, Boise; Surjit S. Chadha; Charles M. Watkins, both of Meridian, all of Id.

[73] Assignee: Micron Technology, Inc., Boise, Id.

[21] Appl. No.: 08/947,061

[22] Filed: Oct. 8, 1997

[51] Int. Cl.[7] .............................. C07C 6/00; C01B 53/00; C09K 11/08
[52] U.S. Cl. .................................. 204/157.15; 204/157.4; 204/157.41; 204/157.43; 252/301.4 R; 252/301.4 F
[58] Field of Search .................... 204/157.15, 157.4, 204/157.41, 157.43; 252/301.4 R, 301.4 F

[56] References Cited

U.S. PATENT DOCUMENTS

| | | | |
|---|---|---|---|
| 3,988,252 | 10/1976 | Ferretti | 252/301.4 H |
| 4,440,831 | 4/1984 | Brownlow et al. | 128/404 |
| 4,479,521 | 10/1984 | Lubold, Jr. et al. | 141/12 |
| 4,524,016 | 6/1985 | Ferretti | 252/301.4 H |
| 4,840,747 | 6/1989 | Fan et al. | 252/301.4 R |
| 4,948,527 | 8/1990 | Ritsko | 252/301.4 R |
| 5,013,480 | 5/1991 | Matsunaga et al. | 252/301.4 H |
| 5,023,015 | 6/1991 | Lagos | 252/301.4 R |
| 5,227,195 | 7/1993 | Sanjurjo | 427/248.1 |
| 5,360,578 | 11/1994 | Leblans et al. | 252/301.4 H |
| 5,601,751 | 2/1997 | Watkins et al. | 252/301.4 |

FOREIGN PATENT DOCUMENTS 6-009219   1/1994   Japan .

OTHER PUBLICATIONS

Fritz et al., High Temperature RTP Processing on Large Area Glass Substrates for Manufacturing Poly Silicon AMLCD's, SID–1995 Display Manufacturing Technology Conference, Santa Clara, pp. 75–77 (Jan. 31–Feb. 2, 1995).

Pignolet, A. et al., Rapid thermal processed thin films of reactively sputtered $Ta_2O_5$, Elsevier Science S.A., pp. 230–234, 1995 No Month Available.

Seidel et al., A Review of Rapid Thermal Annealing (RTA) of B, $BF_2$ and as Ions Implanted into Silicon, Nuclear Instruments and Methods in Physics Research B7/8, pp. 251–260 (1985) No Month Available.

*Primary Examiner*—Edna Wong
*Attorney, Agent, or Firm*—Hale and Dorr LLP

[57] ABSTRACT

Powder phosphors are activated while their particle size is limited in growth to approximately 1 micron or less. The powder phosphors are rapidly annealed with one of a number of methods, including rapid thermal annealing, laser annealing, microwave annealing, and RF annealing.

26 Claims, 1 Drawing Sheet

RAPID ANNEALING OF POWDER PHOSPHORS

STATEMENT OF GOVERNMENT RIGHTS

This invention was made with government support under contract number DABT63-93-C-0025 awarded by Advanced Research Projects Agency (ARPA). The government has certain rights in this invention.

BACKGROUND OF THE INVENTION

The invention relates to methods for forming luminescent powder phosphors for use in display devices.

Display devices, such as field emission devices (FEDs), cathode ray tubes (CRTs), electroluminescent (EL) displays, LCD backlights, plasma discharge displays, and vacuum fluorescent displays (VFDs) all utilize phosphor materials. For example, CRT displays, such as those commonly used in desk-top computer screens, create an image when a scanning electron beam from an electron gun impinges on phosphors disposed on a relatively distant screen, thereby increasing the energy content of the phosphors. This energy is converted and released as luminescence (light emission) through the phosphor-bearing screen.

Similarly, FEDs (which operate at anode voltages well below cathode ray tube displays) combine the cathodoluminescent phosphor technology of CRT displays with integrated circuit technology to create thin, high-resolution displays wherein each pixel is activated by its own electron emitter or collection of emitters. More specifically, cold cathode emitters arranged in a matrix-addressable array emit electrons that excite phosphors on a screen.

While phosphors can convert energy from impinging electrons into luminescence, phosphors may be excited by other types of energy, such as x-rays, gamma rays, various forms of radiation (e.g., ultraviolet, visible or infrared) and electric fields.

Typically, phosphors have at least two ingredients: the first and largest portion is the "host" or "matrix"; and the second, which is provided in amounts ranging from a few parts per million to several percent, is the "activator." As is well known in the art, a variety of powder materials may serve as the host, including some silicates, phosphates, sulfides and oxides of calcium, yttrium, gadolinium, lanthanum, and zinc. Similarly, a number of known powder materials may function as activators, including manganese, copper, silver, thullium, cerium, antimony and some of the rare-earth elements. Phosphor preparation, including the incorporation of activators, is typically done through a high-temperature reaction of well-mixed, finely ground powders of the phosphor components, referred to generally as "precursors."

Other approaches have also been used to make phosphor material. In one process, described in U.S. Pat. No. 4,440,831, phosphor material is made by using silicic acid particles and zinc oxide to make zinc silicate, which is combined with manganese to produce phosphor particles having a size typically in a range of approximately three to twenty microns in diameter. While such relatively large particles have some benefits, they are difficult to process for small displays like FEDs, which can have a pixel size of 30 microns to a side. Consequently, particles that are in this size range pose problems. Moreover, this process, which appears to be specific to zinc silicate, is undesirable for FED applications because zinc silicate has rapid "coulombic aging", i.e., it breaks down quickly.

In other processes with other powder precursors, such as those described in U.S. Pat. No. 4,948,527, conventional annealing processes subject the precursors to temperatures ranging from about 1000° C. to 1650° C. over many hours. Such prolonged heating typically leads to a substantial increase in phosphor particle size, e.g., in a range from 7–25 microns in diameter. This annealing operation contributes most significantly to the growth of the phosphor particle size during fabrication of the phosphor.

Because high resolution display screens, such as certain CRTs, FEDs, plasma displays, EL displays, and VFDs, generally require extremely small particle size (i.e., less than or equal to 1 micron), large phosphor particles are typically milled to a smaller size before being placed on a display screen. Such operations, although necessary to obtain the benefits of smaller particles, are detrimental to the light producing efficiency of the subject phosphor and destroy the physical integrity of the particles.

Accordingly, it would be desirable to produce relatively small phosphor particles that are sufficiently small for flat panel display devices without milling operations.

SUMMARY OF THE INVENTION

The present invention is directed to methods and devices for activating phosphors. Specifically, the invention is directed to methods and devices for annealing powder phosphor precursors at high temperatures over a short period of time.

In accordance with one embodiment of the invention, a method for activating powder phosphors includes the step of annealing the phosphor precursors at a temperature of about 800° C. to about 1650° C. for a time period of no more than about 10 minutes, preferably in a range of about 5 to 10 minutes, to produce particles with a diameter no greater than one micron.

In another aspect, the invention includes heating phosphor precursors for a short period of time using one of rapid thermal annealing, laser heating, microwave heating, and RF heating. The heating is preferably done for fewer than 10 minutes to produce particles no bigger than 1 micron, and preferably using a compound of yttrium, such as yttrium oxide, yttrium silicate, or yttrium aluminum gallium oxide as the host for the phosphor.

In yet another aspect of the present invention, the invention includes a process of forming phosphor with an activator that includes a yttrium compound, such as yttrium oxide, yttrium silicate, or yttrium aluminum gallium oxide, and firing the yttrium host with an activator for a short period of time, preferably fewer than 10 minutes, to produce particles no larger than 1 micron in size.

The improved methods and devices for annealing phosphors at high temperatures over a short period of time result in phosphor particles having a diameter of 1 micron or less, without milling or other processes that have an adverse effect on quality. A further understanding of the nature and advantages of the invention may be realized by reference to the remaining portions of the specification.

DETAILED DESCRIPTION

The present invention provides several methods for activating powder phosphors in a very short period of time, thereby minimizing particle growth. In accordance with the present invention, finely ground phosphor precursors may be rapidly annealed through the use of several technologies including rapid thermal annealing (RTA), laser, microwave, and radio frequency (RF). Phosphor precursors, consisting of a host, activator, and any desired fluxes, may be prepared from a solution, vapor phase reaction, or by solid state reactions.

In accordance with each of the following embodiments, finely ground powders of phosphor precursors are annealed at a relatively high process temperature (typically 800 C–1650° C.) over a relatively short time period (typically several minutes). These parameters are quite flexible. For example, when using certain phosphor precursors (such as $Y_3 (Al, Ga)_5 O_{12}:Tb$), the process temperature may be increased well beyond 1600° C. provided the duration of exposure is sufficiently shortened. As will be apparent to those having ordinary skill in the art, these parameters will be largely dependent upon type and quantity of phosphor precursors, and may be determined through empirical analysis.

Figure 1:
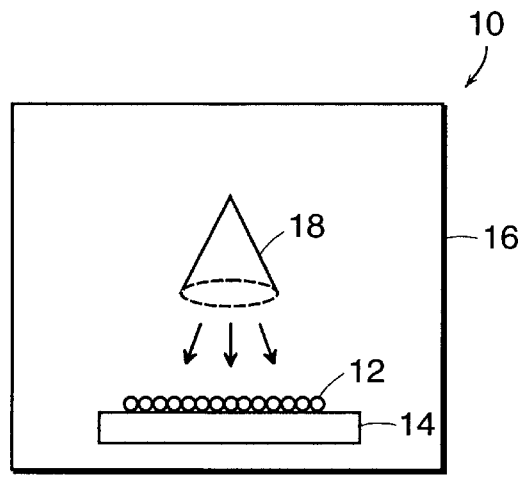
FIGS. 1–4 are side views illustrating heating by a number of different processes according to the present invention.

Referring to FIG. 1, according to one embodiment of the present invention, a rapid thermal annealing (RTA) system 10 is utilized to anneal phosphor precursors. Any rapid thermal annealing system may be used which minimizes phosphor particle size growth during annealing, yet still activates the phosphor. A particular rapid thermal annealing system useful in the practice of the present invention is the Rapid Thermal Processing (RTP) system described in Fritz et al., *High Temperature RTP Processing on Large Area Glass Substrates for Manufacturing Poly Silicon AMLCD's* SID-1995 Display Manufacturing Technology Conference, Santa Clara, pp. 75–77 (Jan. 31–Feb. 2, 1995), which is hereby incorporated by reference in its entirety for all purposes.

In accordance with this embodiment, phosphor precursors 12 are spread out on a plate-like crucible 14 in a thin layer in a chamber 16. Precursors 12 are scanned under a 1 cm rod by 36 cm light beam generated by a high energy arc lamp 18. The radiation produced by arc lamp 18 is absorbed by phosphor precursors 12. Precursors 12 are thereby heated at the required process temperatures governed, in part, by the scanning rate. The higher process temperature (i.e., upwards to 1650° C.) and shorter exposure period of this method (approximately 5 minutes) minimizes particle growth while achieving activation of the powder phosphors.

An example of a device for performing such rapid thermal annealing of phosphor precursors is the RTP 8000 manufactured by Varian Corp. of Palo Alto, Calif. A discussion of rapid thermal annealing that identifies additional equipment useful in this embodiment is provided in Seidel et al., *A Review of Rapid Thermal Annealing (RTA) of $B, BF_2$ and As Ions Implanted into Silicon*, Nuclear Instruments and Methods in Physics Research B7/8, pp. 251–260 (1985), which is hereby incorporated by reference in its entirety for all purposes.

As noted above, the particular intensity and duration of this annealing process is dependent upon the chosen phosphor precursors, which may be determined on a case-by-case basis through empirical analysis. However, as an example, using $Y_2O_3$ as a host and 5% of Eu as an activator, the RTP 8000 may create phosphor by annealing these precursors at a temperature of 1500° C. for approximately 5 minutes.

Figure 2:
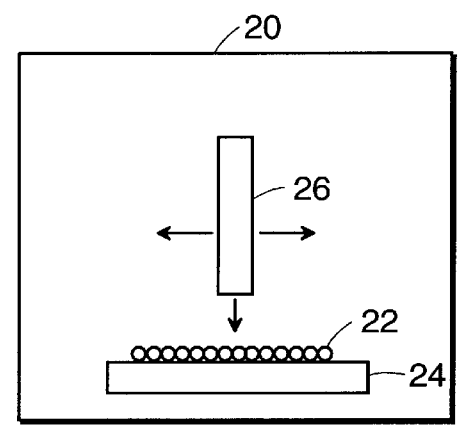

Referring to FIG. 2, according to another embodiment of the present invention, laser annealing is used to activate the powder phosphor precursors. Any laser annealing technique which minimizes phosphor particle growth during annealing, yet still activate the phosphors, may be utilized. In accordance with this embodiment, in a chamber 20 phosphor precursors 22 are spread out on a flat, ceramic tool 24 (i.e., made from a relatively strong oxide or nitride such as zirconium or aluminum) in a thin layer to provide for maximum direct exposure to a laser 26. Preferably, a Nd:YAG laser emitting at 1.06 microns is used in this annealing process. During processing, laser 26 emits a defocused beam of energy on the precursor surface that rapidly anneals this material. Multiple passes of the laser beam may be necessary to ensure adequate heating.

The actual intensity and duration of this annealing process is dependent upon the chosen phosphor precursors. However, as an example, using the same host and activators as in the previous embodiment, a Nd:YAG laser emitting at 1.06 microns can satisfy the time and temperature requirements set out above through appropriate adjustment of laser output energy and defocus level.

Figure 3:
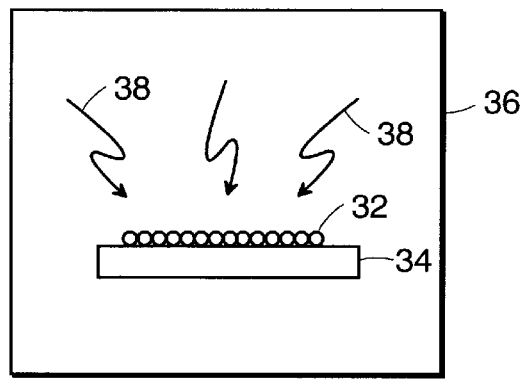

Referring to FIG. 3, according to yet another embodiment of the invention, microwave annealing can be used to activate the powder phosphors. Any microwave annealing technique which minimizes phosphor particle growth during annealing yet still activates the phosphor may be utilized. Phosphor precursors 32 are provided on a support structure 34 in a chamber 36 and microwave energy 38 is applied to precursors 32. Preferably, a microwave whose frequency is tuned to render the proper anneal energy for the particular precursors used. Such a machine may be obtained from Microdry, Inc., of Crestwood, Ky. The specific frequency of this annealing process is dependent upon the chosen precursors.

Figure 4:
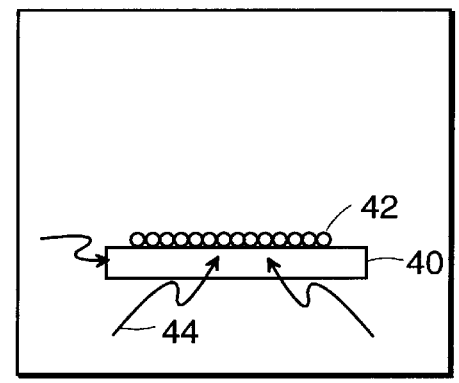
Figure 5:
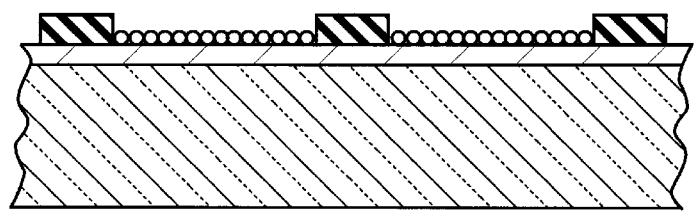
FIG. 5 is a cross-sectional view illustrating powder phosphors on a faceplate.

Referring to FIG. 4, in a further embodiment of the invention, RF annealing can be used to activate the powder phosphors while limiting phosphor particle growth. Any RF annealing technique which minimizes phosphor particle growth, yet still activates the phosphors, may be utilized. This method uses a graphite susceptor to hold the phosphor precursors. The susceptor absorbs RF energy 44 and, as a result, glows white hot during the annealing process. Phosphor precursors 42 are fed into susceptor 40 at a rate fast enough to produce fine grain phosphor particles but sufficiently slow to ensure activation. The necessary RF parameters in this embodiment are energy, feed rate of phosphor precursors, and time (i.e., the length of time needed for the reaction to go forth).

Like the foregoing embodiments, RF operating parameters required to achieve necessary annealing conditions are dependent upon chosen phosphor precursors.

In each of the foregoing embodiments, preferred host compounds are oxalates, carbonates, nitrates, sulfates, and hydroxides.

In addition to producing consistently small phosphor particles, the foregoing rapid annealing processes enable quick evaluation of the activator concentration after annealing. Prior art annealing processes lasting an hour or more created a prolonged delay in gaining access to the phosphor to determine whether the activator concentration was successful.

Moreover, because annealing processes carried out in accordance with the invention result in extremely intense but short heating cycles, the resulting phosphor particles cool down very quickly when annealing is complete. No additional cooling processes are necessary. In contrast, prior art processes require extended periods of time to cool down. In fact, additional operations such as quenching (exposing annealed material to cool water) are typically carried out to accelerate the cooling process.

EXAMPLES

In the following three prophetic examples, exemplary recipes for creating red, green, and blue emitting phosphors are provided. These recipes include both the conventional (i.e., long) annealing cycles and the shortened cycles in accordance with the present invention. In each case, any of the foregoing annealing processes may be utilized (i.e. RTP, laser, microwave, and RF).

Example 1 is a known recipe for red emitting powder phosphor. In accordance with this recipe, such phosphor may be created by:

1. dissolving yttrium oxide in hydrochloric acid together with 5% europium oxide by heating to 80° C. and then adding hot oxalic acid solution;
2. stirring for 30 minutes and allowing compound to settle;
3. filtering the resulting white precipitate of yttrium and europium oxalates after this precipitate settles down;
4. washing the filtered precipitate with copious quantities of deionized water and then isopropyl alcohol to dry;
5. further drying the oxalates overnight at 120° C. in an oven; and
6. firing the dried oxalates in suitable crucibles at 1550° C. for 6 hours to form phosphor. This material is subsequently crushed and sieved in preparation for use.

In accordance with the present invention, step 6 may be replaced by heating the oxalates at 1500° C. for 5 minutes using any of the four embodiments identified above. With this modification, the resulting phosphor particles are approximately 1 micron or less in diameter and therefore no crushing or sieving is required.

Example 2 is a recipe for green emitting powder phosphor. In accordance with this recipe, such phosphor may be created by:

1. combining appropriate quantities of yttrium oxide, aluminum oxide, gallium oxide and terbium oxide to form $Y_3(Al,Ga)_5O_{12}$:Tb, where the terbium concentration is about 1%;
2. milling the oxides overnight in isopropyl alcohol for 24 hours to make an extremely fine suspension;
3. drying the suspension in an oven at 120° C. overnight for 12 hours; and
4. firing the dried material in suitable crucibles at 1600° C. for 14 hours to form phosphor. This material is subsequently crushed and sieved in preparation for use.

In accordance with the present invention, step 4 may be replaced by heating the dried material at 1600° C. for 10 minutes using any of the four embodiments identified above. With this modification, the resulting phosphor particles are approximately 1 micron or less in diameter and therefore no crushing or sieving is required.

Example 3 is a recipe for blue emitting powder phosphor. In accordance with this recipe, such phosphor may be created by:

1. combining appropriate quantities of yttrium oxide, silicic acid, and cerium oxide to form $Y_2SiO_5$:Ce, where the cerium concentration is from 1–5% of the $Y_2SiO_5$ lattice;
2. milling the silicic acid in isopropyl alcohol for 2 hours;
3. adding the yttrium oxide and cerium oxide to the silicic acid and continuing the milling for another 22 hours;
4. drying the resulting very fine suspension overnight at 120° C. for 12 hours; and
5. firing the dried material in suitable crucibles at 1450° C. for 14 hours to form phosphor. This material is subsequently crushed and sieved in preparation for use.

In accordance with the present invention, step 5 may be replaced by heating the dried material at 1450° C. for 10 minutes using any of the four embodiments identified above. With this modification, the resulting phosphor particles are approximately 1 micron or less in diameter and therefore no crushing or sieving is required.

As is well known to those having ordinary skill in the art, there are alternative methods for making phosphors as well as other phosphors that can be used in displays such as FEDs, CRTs, VFDs, EL displays.

While certain embodiments of the invention have been described, various alternatives, modifications and equivalents may be used. Therefore, the above description should not be taken as limiting the scope of the invention which is defined by the appended claims.

What is claimed is:

1. A method comprising annealing finely ground phosphor precursors at a temperature of about 800° C. to about 1650° C. for a time period of no more than 10 minutes to activate powder phosphors while maintaining the size of the phosphors at no greater than 1 micron in diameter each.

2. The method of claim 1, wherein the annealing includes rapid thermal annealing.

3. The method of claim 1, wherein the annealing includes laser annealing.

4. The method of claim 1, wherein the annealing includes microwave annealing.

5. The method of claim 1, wherein the annealing includes radio frequency annealing.

6. The method of claim 1, wherein the time period is more than five minutes.

7. The method of claim 1, wherein the phosphors are maintained at no more than about 1 micron without milling.

8. A method comprising annealing phosphor precursors at a temperature between about 800° C. to about 1650° C. for a sufficiently short period of time such that the resulting phosphor particles are activated, but are no more than 1 micron in diameter each as a result of the annealing without milling.

9. The method of claim 8, wherein the annealing includes rapid thermal annealing.

10. The method of claim 8, wherein the annealing includes laser annealing.

11. The method of claim 8, wherein the annealing includes microwave annealing.

12. The method of claim 8 wherein the annealing includes radio frequency annealing.

13. A method for activating red emitting powder phosphor comprising annealing oxalates at a sufficiently high temperature to activate the red emitting powder phosphor for a total of approximately 5 minutes.

14. The method of claim 13 wherein the oxalates are a combination of yttrium and europium oxalates.

15. The method of claim 13, wherein the annealing is performed such that the activated phosphor powder has particles with a diameter no greater than 1 micron.

16. The method of claim 15, wherein the method is performed without milling.

17. A method for activating green emitting powder phosphor comprising annealing dried oxides at a sufficiently high temperature to activate the green emitting powder phosphor for a total of approximately 10 minutes.

18. The method of claim 17 wherein the dried oxides includes yttrium oxide, aluminum oxide, gallium oxide and terbium oxide.

19. The method of claim 17, wherein the annealing is performed such that the activated phosphor powder has particles with a diameter no greater than 1 micron.

20. The method of claim 19, wherein the method is performed without milling.

21. A method for activating blue emitting powder phosphor comprising annealing dried oxides at a sufficiently high temperature to activate the blue emitting powder phosphor for a total of approximately 10 minutes.

22. The method of claim 21 wherein said dried oxides includes silica, yttrium oxide and cerium oxide.

23. The method of claim 21, wherein the annealing is performed such that the activated phosphor powder has particles with a diameter no greater than 1 micron.

24. The method of claim 23, wherein the method is performed without milling.

25. A method for producing phosphor powders comprising mixing a host and an activator, wherein the host includes a compound selected from the group consisting of yttrium oxide, yttrium aluminum gallium oxide, and yttrium silicate, and annealing the mixture for a sufficiently short period of time so that the particles have a diameter no greater than 1 micron as a result of the annealing and without milling.

26. A method for producing phosphor powders comprising mixing a host and an activator, wherein the host includes a compound selected from the group consisting of yttrium oxide, yttrium aluminum gallium oxide, and yttrium silicate, and annealing at a temperature in the range of about 800° C. to 1650° C. for no more than 10 minutes.

* * * * *